United States Patent [19]
Shaw

[11] 3,728,895
[45] Apr. 24, 1973

[54] TRIAXIAL COMPRESSION TEST APPARATUS

[75] Inventor: Garrett D. Shaw, Rolling Hills, Calif.

[73] Assignee: TRW Inc., Redondo Beach, Calif.

[22] Filed: Dec. 18, 1970

[21] Appl. No.: 99,356

[52] U.S. Cl. ........................................73/94, 73/103
[51] Int. Cl. ..............................................G01n 3/08
[58] Field of Search ..................................73/94, 103

[56] References Cited

UNITED STATES PATENTS

| | | | |
|---|---|---|---|
| 3,423,995 | 1/1969 | Scott et al. | 73/94 |
| 3,423,994 | 1/1969 | Scott et al. | 73/94 |

FOREIGN PATENTS OR APPLICATIONS

| | | | |
|---|---|---|---|
| 211,849 | 2/1968 | U.S.S.R. | 73/94 |

*Primary Examiner*—Jerry W. Nyracle
*Attorney*—Daniel T. Anderson, Donald R. Nyhagen and Jerry A. Dinardo

[57] ABSTRACT

A high-speed triaxial compression test apparatus having a hollow rectangular frame with a central rectangular test cavity for containing a test sample and a rectangular opening to the test cavity in each side of the frame containing a removable pressurizing module having an inner movable pressure wall, such as a flexible diaphragm, which is pressurized through an inlet port in the module to exert a compression load on the test sample along the respective cavity axes, and transducers for generating signals representing the pressure on and displacement of the pressure wall. The primary application of the apparatus is testing soil and rock samples and other natural and fabricated materials to obtain data concerning their mechanical properties.

1 Claim, 3 Drawing Figures

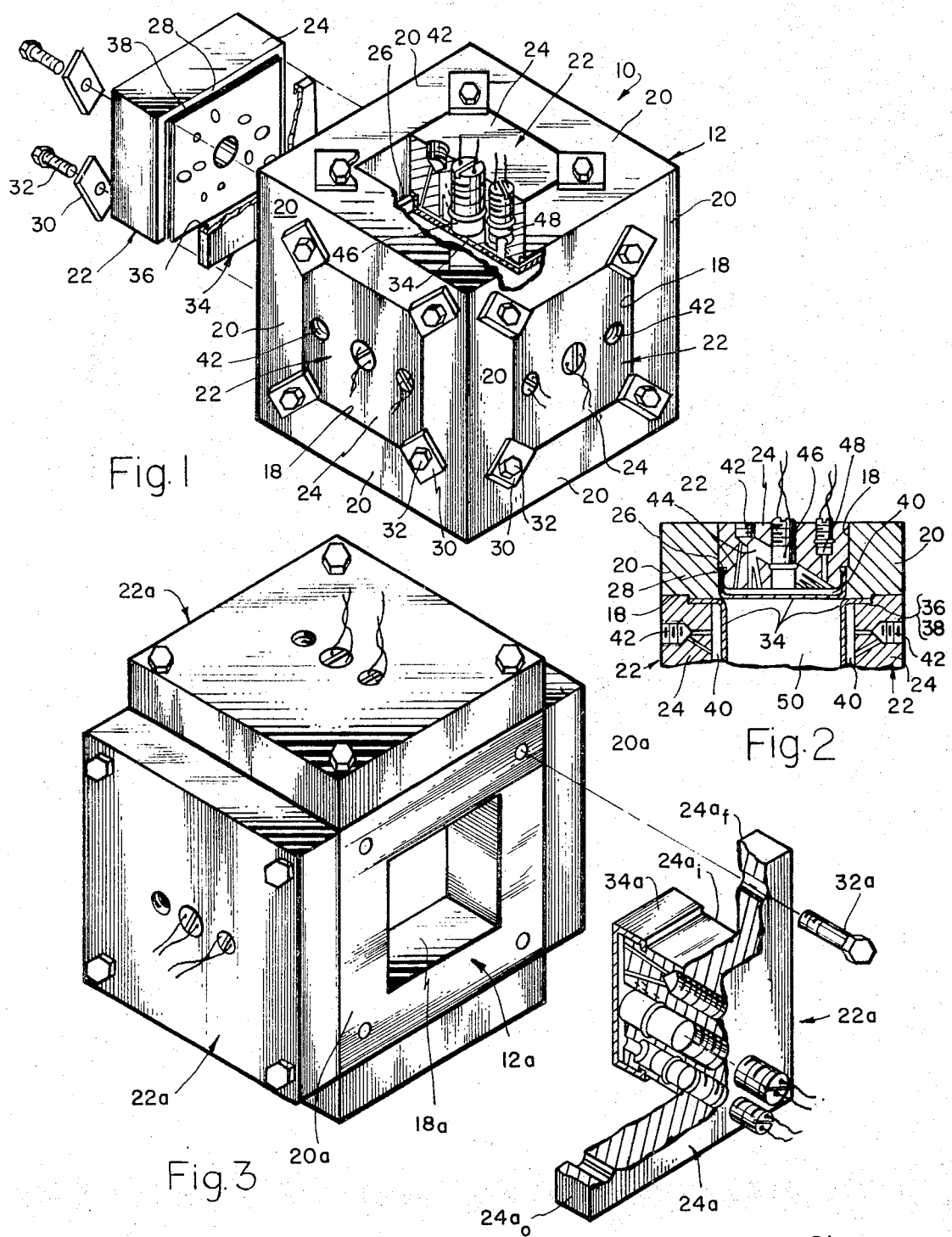
Garrett D. Shaw
INVENTOR.

TRIAXIAL COMPRESSION TEST APPARATUS

BACKGROUND OF THE INVENTION

1. Field of the Invention

This invention relates generally to the field of materials testing and more particularly to a high-speed, triaxial compression test apparatus for soil, rock and other natural and fabricated materials.

2. Prior Art

As will appear from the ensuing description, the present compression test apparatus may be employed to test a wide variety of natural and fabricated materials. However, the primary application of the apparatus is testing soil and rock samples. For this reason, the invention will be described in connection with this particular application.

A knowledge of the constitutive or mechanical properties of soil and rock is important if not essential to the study and/or design of related structures, such as structures to be constructed on or within natural soil or rock formations, as well as to the study of natural and nuclear or other explosively induced shock phenomena. The prior art is replete with a vast assortment of test apparatus for determining such material properties. By way of example, a few of the prior art patents disclosing test apparatus for the purpose described are U.S. Pat. Nos. 2,810,289; 2,811,038; 3,119,341; 3,216,242; 3,423,994; 3,423,995; 3,443,423; and 3,448,608.

Generally speaking, test apparatus of the character described comprises a container with a cavity for receiving a sample of the soil or rock to be tested, means for subjecting the sample to a compression load, and means for measuring the compaction and/or other parameters of the sample which are affected by the applied force. In some test apparatus, the test force or loading is applied along a single axis. The Karol patent, U.S. Pat. No. 2,811,038, discloses a single axis test apparatus of this kind. In other test apparatus, such as that disclosed in the Scott et al. U.S. Pat. No. 3,423,995, a loading force is applied to the test sample along each of three mutually perpendicular axes.

SUMMARY OF THE INVENTION

The present invention provides an improved triaxial compression test apparatus of the general type disclosed in the latter Scott U.S. Pat. No. 3,423,995. The present test apparatus has a hollow, one-piece rectangular frame which is typically cubic in shape and machined from a single block of metal. Within the frame is a central rectangular void. Each side of the frame contains a rectangular opening which is centered on the respective axis of and has the same cross-section as the void.

Removably mounted within each frame side opening is a pressurizing module having a rectangular body plate which fits closely within the opening. Means are provided for releasably securing the plate within the opening. At the inner side of the plate is a movable pressure wall which defines with the plate a pressure chamber. In the disclosed embodiments, this pressure wall is a rectangular diaphragm perimetrically sealed to the edges of the module plate. The diaphragms of the six modules together define a rectangular test cavity for receiving a sample of the material to be tested.

Each module of the apparatus has a port communicating with the respective pressure chamber through which the chamber may be pressurized to apply a compression load through the pressure wall to the test sample along the respective test cavity axis. Also embodied in each module are transducers for producing signals representing the applied pressure and the displacement of the pressure wall. The modules may be selectively pressurized to apply a compression load to any one or more selected sides of the test sample.

Primary advantages of the apparatus reside in its ease of test sample placement within the test cavity; improved sealing and uniform loading capability; reduced face plane bending and other distortion affecting the test results; and high speed cycling or shock loading capability. These advantages stem primarily from the unique unitary frame and separate pressurizing module arrangement of the test apparatus.

BRIEF DESCRIPTION OF THE DRAWINGS

In the drawings:

FIG. 1 is an exploded perspective view partly in section of a present triaxial compression test apparatus;

FIG. 2 is a fragmentary section through the test apparatus; and

FIG. 3 is an exploded perspective view of a modified triaxial compression test apparatus.

DESCRIPTION OF THE PREFERRED EMBODIMENTS

The compression test apparatus 10 illustrated in FIGS. 1 and 2 has a hollow, one-piece rectangular frame 12 which is preferably machined from a single block of metal. Within the frame is a central rectangular void. Each side of the frame 12 has a rectangular opening 18 to the central void. In the particular inventive embodiment shown, the frame 12 and its central void are cubic in shape and each frame side opening 18 has an inner square cross-section matching that of the void. The configuration of the frame 12 is such that the frame has integral rectangular load bearing sections 20 extending between and joining the opposite parallel frame sides through which forces are transmitted between the sides.

Removably mounted within each frame side opening 18 is a self-contained pressurizing insert of module 22. The several modules are identical so that a description of one will suffice for all. Each module has a rectangular body plate 24 which is sized to fit closely within the respective frame opening. In the particular embodiment under discussion, the inner ends of the frame opening and module plate are reduced to form shoulders 26, 28 about the opening and plate which abut to position the plate in the opening. The inner end of each frame opening has the same cross-section as the central frame void. The module plate 24 is releasably secured in its frame opening 18 by four hold-downs 30 which engage over the four corners of the plate and are attached to the frame 12 by screws 32.

At the inner side of the module plate 24 is a movable pressure wall 34 in the form of a flexible diaphragm. Diaphragm 34 extends across the inner face of the plate and is perimetrically sealed to the plate about the plate edges. In the particular embodiment shown, the diaphragm is sealed to the plate by engagement of a perimetrical bead 36 about the diaphragm within a sealing groove 38 about the edges of the plate. The diaphragm and plate define therebetween a pressure chamber 40.

Module plate 24 has a port 42 opening through its outer surface for connection to a source of pressurizing fluid, such as hydraulic fluid. Port 42 communicates to the pressure chamber 40 through a number of fluid passages 44. These passages open to the chamber 40 at a number of positions spaced about the chamber so as to permit rapid pressurizing of the chamber.

Each pressurizing module 22 also includes a pair of transducers 46, 48. Transducer 46 is a displacement transducer for producing an electrical output representing the displacement of the pressure wall as diaphragm 34 from a given reference position, such as the position occupied by the diaphragm prior to the pressurizing of the pressure chamber 40 at the start of a test. This transducer may comprise a proximity transducer which produces an electrical output proportional to the spacing between the transducer and the diaphragm which, in this instance, will be a metal diaphragm or other diaphragm with a metallic member opposite the transducer. Transducer 48 is a pressure transducer which is exposed to the fluid pressure in pressure chamber 40 and produces an electrical output representing the fluid pressure.

As noted earlier and shown in the drawings, each side opening 18 of the frame 12 contains a pressurizing module 22. Accordingly, there are a pair of the modules along each of the three axes of the test cavity 14. The diaphragms 34 of the six modules together define and form the six walls of the rectangular test cavity 50.

In use of the test apparatus 10, one or more of the pressurizing modules 22 are removed to provide access to the test cavity 50, and the soil, rock, or other material to be tested is placed in the cavity. A pressurizing fluid is then supplied to a selected one or more of the modules through their ports 42 to pressurize the corresponding pressure chambers 40 and thereby urge the respective diaphragms 34 inwardly against the test sample. Assuming all of the modules are pressurized, the sample is compressed between a pair of opposing walls of the test cavity 50 along each of the three axes of the cavity. In this regard, it will be understood that the diaphragms are constructed of any suitable plastic material or other material which is capable of yielding under the fluid pressure in the pressure chambers 40 to exert compression loads on the test sample. During inward displacement of the diaphragms 34 under pressure, the adjacent diaphragms abut along the corner edges of the test cavity 50 with the contacting surface portions of the diaphragms disposed approximately in 45° planes bisecting the respective corner, such that the cavity is virtually devoid of any gaps at the corner edges.

During the sample loading cycle, the outputs of the several module transducers 46, 48 are monitored to obtain data from which may be determined the constitutive or mechanical properties of the test sample. The modules 22 may be pressurized according to any selected pressure-time program ranging from relatively slow rate of change to a relatively high rate amounting essentially to impact loading of the test sample. Moreover, the pressure-time program for the modules may be the same or different depending upon the desired test conditions to be achieved.

The modified test apparatus 10a of FIG. 3 is identical to that just described except for the configuration of the pressurizing modules 22a and their method of attachment to the frame 12a. Thus, each module 22a has a rectangular body plate 24a with an inner rectangular plate portion $24a_i$ which fits closely within the respective frame side opening 18a and is sealed to the module pressure wall or diaphragm 34a in the same manner as in the test apparatus 10 and an outer rectangular plate portion $24a_o$ which projects edgewise beyond the inner plate portion to form a mounting flange $24a_f$ about the latter plate portion.

The mounting flange $22a_f$ of each module 22a seats against the outer face of the frame 12a about the respective frame side opening 18a. The modules are secured to the frame by bolts 32a which extend through the flanges $24a_f$ of a pair of modules 22a at opposite sides of the frame and through the intervening corner load transmitting sections 20a of the frame. Thus, the bolts serve as tie rods which secure opposing parallel modules to the frame. The crossing bolts are laterally offset such that they do not interfere with one another. According to the preferred practice of the invention, the bolts 32a are initially tightened to prestress them in tension and thereby prestress the frame load transmitting sections 20a in compression. This prestressing of the frame sections reduces deformation of the frame under load. The modified apparatus 10a is used in the same manner as the test apparatus 10.

The present test apparatus possesses several inherent advantages. Among the foremost of these advantages are:

1. Capability of much higher loading pressures than the existing test devices.
2. The pressurizing modules are inherently capable of adequate sizing to accommodate fluid passages of sufficient diameter and distribution to achieve short (high speed) loading cycles.
3. The frame configuration is inherently capable of sustaining high pressure loading due to the straight line tension load paths provided by the frame corner sections.
4. The pressurizing modules are independent subassemblies which are almost totally independent of one another with regard to their dimensional tolerances and their diaphragms.
5. The module-to-frame seals are completely independent of the adjacent modules.
6. The separate modules provide maximum ease of sample loading as well as servicing.

I claim:

1. A triaxial compression test apparatus comprising:
    a hollow, one-piece rectangular frame having integral load bearing sections of substantially equal uniform cross-section extending along the frame edges between opposite parallel sides of the frame and permanently integrally joined to one another at the frame corners over the entire cross-section of each section so as to provide a frame devoid of separable joints, said frame containing a central rectangular test cavity and a rectangular opening in each side of said frame on the respective axis of said cavity, whereby said frame has a pair of side openings on each of the three axes of said cavity located in opposite parallel sides of said frame;

a pressurizing module at each frame side including a rectangular plate fitting snugly but removably within the respective frame opening, a rectangular diaphram at the inner side of said plate having edge portions positioned between the plate edges and the wall edges of the respective frame opening and beads along said edge portions seating in grooves in said plate edges for securing said diaphram to said plate in fluid sealing relation therewith to define between said diaphragm and said plate a pressure chamber, and a port in said plate communicating with said chamber through which a pressure fluid may be introduced into said chamber to urge said diaphram against a test sample within said cavity; and means releasably securing each module in its respective frame opening.

* * * * *

UNITED STATES PATENT OFFICE
CERTIFICATE OF CORRECTION

PATENT NO. : 3,728,895
DATED : April 24, 1973
INVENTOR(S) : Garrett D. Shaw

It is certified that error appears in the above-identified patent and that said Letters Patent are hereby corrected as shown below:

Figure 2, top of module, numeral 22 needs arrow.

Signed and Sealed this second Day of December 1975

[SEAL]

Attest:

RUTH C. MASON
Attesting Officer

C. MARSHALL DANN
Commissioner of Patents and Trademarks